Feb. 11, 1964　　　S. H. BINGHAM　　　3,120,820
HYBRID RAPID TRANSIT TRUCK

Filed June 30, 1961　　　4 Sheets-Sheet 1

INVENTOR.
SIDNEY H. BINGHAM
BY Darby & Darby
ATTORNEYS

Feb. 11, 1964 S. H. BINGHAM 3,120,820
HYBRID RAPID TRANSIT TRUCK
Filed June 30, 1961 4 Sheets-Sheet 2
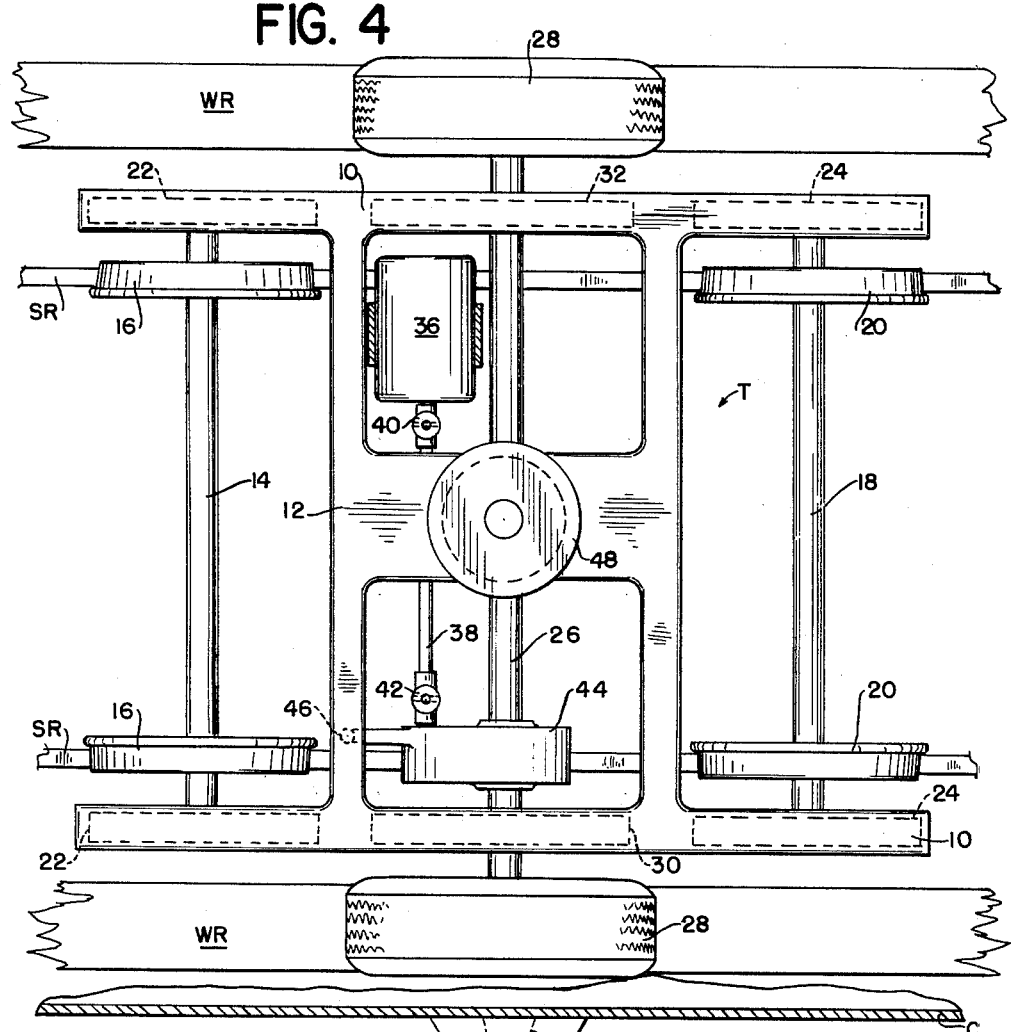
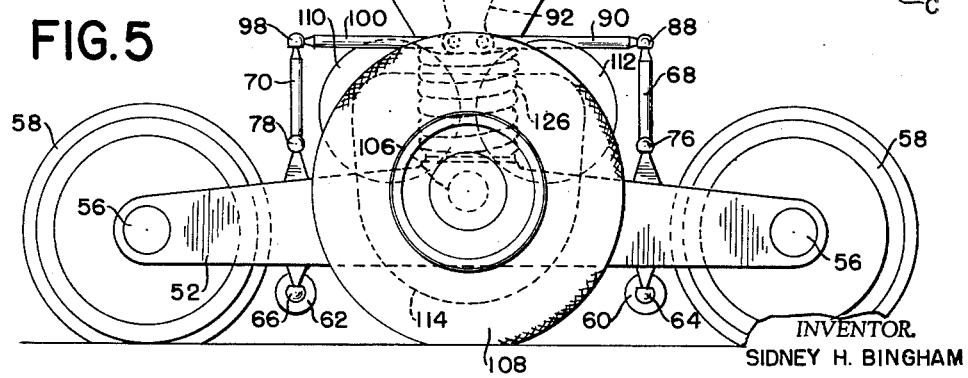
INVENTOR.
SIDNEY H. BINGHAM
BY
*Darby & Darby*
ATTORNEYS Feb. 11, 1964  S. H. BINGHAM  3,120,820
HYBRID RAPID TRANSIT TRUCK
Filed June 30, 1961  4 Sheets-Sheet 3

INVENTOR
SIDNEY H. BINGHAM
BY
ATTORNEYS

Feb. 11, 1964    S. H. BINGHAM    3,120,820
HYBRID RAPID TRANSIT TRUCK
Filed June 30, 1961    4 Sheets-Sheet 4

INVENTOR.
SIDNEY H. BINGHAM
BY Darby & Darby
ATTORNEYS

United States Patent Office 3,120,820
Patented Feb. 11, 1964

3,120,820
HYBRID RAPID TRANSIT TRUCK
Sidney H. Bingham, 109 E. 35th St., New York, N.Y.
Filed June 30, 1961, Ser. No. 120,998
7 Claims. (Cl. 105—215)

This invention relates to light weight powered vehicle trucks of special application to special use in railway, freight and passenger cars.

A broad object of the invention is to provide a light weight truck frame assembly with four conventional flanged steel wheels and two additional powered rubber tired wheels running on parallel adjacent tracks to those on which the flanged wheels run.

Another object of the invention is to provide a proportioned suspension system for distributing the car loading between the flanged wheels and the rubber tired wheels.

A further object of the invention is to provide a vehicle powered truck having flanged steel wheels to provide guidance and resistance to side shearing forces in order to take advantage of the established safe and reliable operation demonstrated by existing railroad practice in combination with powered rubber tired wheels to take advantage of higher tractive and braking force even though, for example, it is found that one-half the load is carried by the rubber tired wheels.

Still another advantage of this combination is the availability of standard or conventional switching and grade crossing operation.

Still another advantage is to secure lateral stability because of the wider spacing between the rubber tired wheels in reference to the flanged steel wheels, and an advantage highly desirable in modern light weight cars.

A further advantage is that the truck will negotiate the road curves without slip angle for the rubber tired wheels, thereby avoiding drag and wear thereon.

Still another advantage is the increased adherence coefficient of the rubber tired wheels to their rails, the advantage of the crushing forces for snow and ice created by the steel wheels, thereby to insure safe running.

A further advantage of the combination as will appear later is the arrangement wherein the entire load is transferred to the related steel wheels in the event of a tire blow-out when the rubber tired wheels are of the pneumatic type, and in cases where the car is trailed over conventional railway track.

Another advantage, as will appear later, is in the elimination of bevel or hypoid driving gears in the power transmission system.

Still other advantages are higher reliability and lower maintenance of the power transmission system due to the absence of angle gears, as well as a saving in weight.

Other and more detailed advantages of the novel constructions herein disclosed will become apparent from the following description of the modifications of the invention illustrated in the accompanying drawings.

In those drawings:

FIGURE 4 is a top plan view of the truck assembly of the preceding figures;

FIGURE 5 is a side elevational view from the right side of FIG. 6 of a modified truck assembly in accordance with this invention showing some parts in cross-section;

Generally speaking a broad object of this invention is to obtain all the advantages resulting from the addition to a flanged steel wheel supported truck assembly for a vehicle, of powered rubber tired driving wheels, all including a proportioning spring suspension system whereby the load on the truck assembly is proportionately distributed between the steel wheels as a unit and the rubber tired wheels as a unit. Important advantages of this arrangement reside in the fact that the guidance and resistance to side shearing forces provided by flanged steel wheels are retained in combination with the gain in tractive and braking power due to the adherence coefficient of rubber. For example, if one-half the normal loading for the truck is transferred to the rubber tired wheels, improved tractive effort results from the fact that the adherence coefficient of rubber is at least four times higher than that of steel. Other and more detailed advantages of the invention will be apparent to those skilled in the art.

The form of the invention illustrated in FIGS. 1 to 4 inclusive will now be described in detail. As is clear from these figures, the trackage system includes a pair of conventional steel rails SR and a pair of wooden rails WR spaced from and extending parallel to the steel rails, as is clear from FIGS. 3 and 4. As illustrated, the car includes any suitable form of body C supported towards each end by the truck assemblies of this invention which have been generally indicated at T in FIG. 1.

Figure 2:
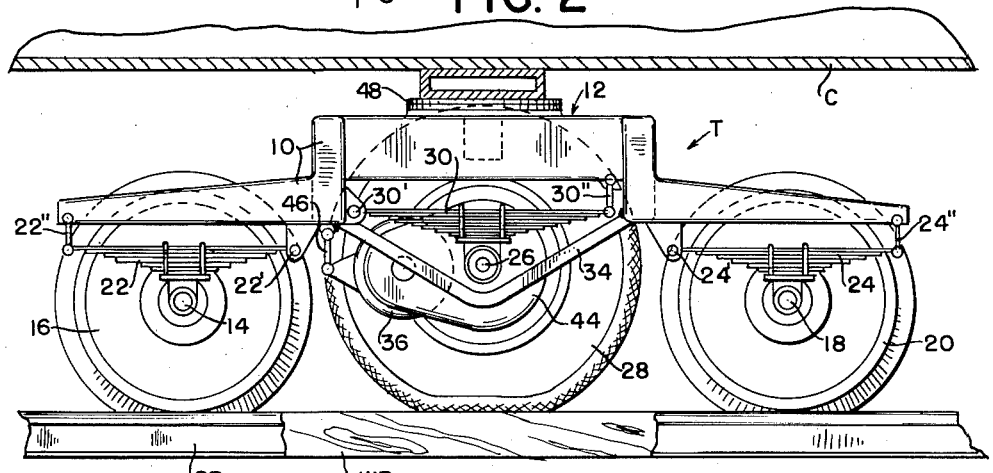
FIGURE 2 is an enlarged side elevational view of one of the truck assemblies showing important parts in cross-section and some parts broken away in order to simplify the illustration.
Figure 3:
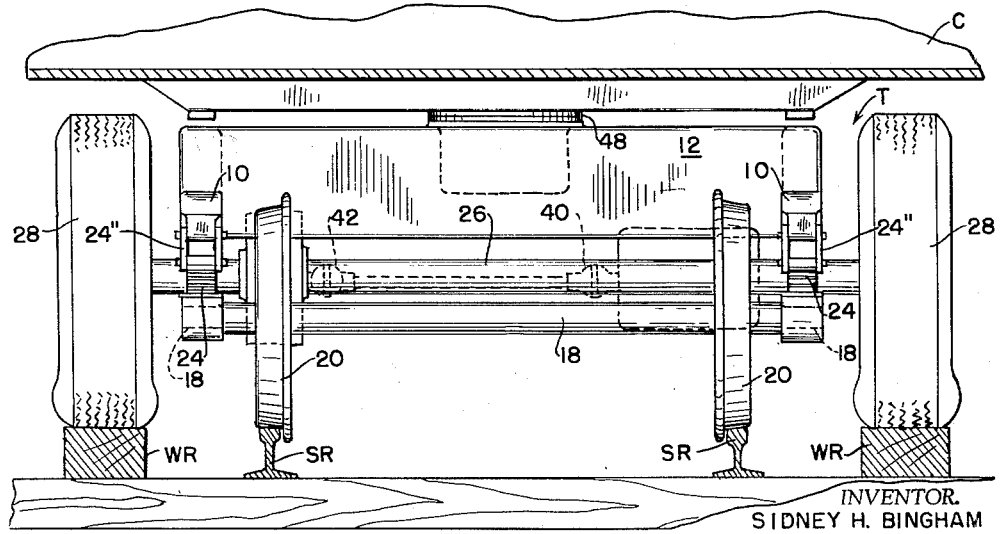
FIGURE 3 is a righthand elevational view of the structure illustrated in FIG. 2.

The details of construction of the truck are set out in FIGS. 2, 3 and 4. As best seen from FIG. 4, the truck frame comprises a pair of side frame members 10 connected by a cross-frame member 12, which might be termed the bolster. All these frame members are illustrated as consisting of a single casting, but as is apparent, they could be built up of suitable structural members. Journaled fore and aft on the frame are the single piece axles 14 and 18, on which are mounted respectively conventional flanged steel wheels 16 and 20. The axles are journaled in bearings secured to the suspension springs 22 and 24, respectively, as shown. Each spring 22 is pivotally connected at one end, as at 22' to a bracket on the truck frame, and pivotally connected by means of a link 22" at its other end to the truck frame. Similarly, each spring 24 is pivotally connected at one end, as at 24', to a bracket on the truck frame and pivotally connected at the other end by a link 24" to the frame.

A third axle 26, positioned normally between the other two axles, is provided with rubber tired wheels 28, which have been illustrated as of the pneumatic type. The axle 26 is journaled in bearings secured to the springs 30 and 32. Both of these springs are secured to the truck frame in the manner illustrated with respect to the spring 30. One end of this spring is pivotally connected at 30' to a bracket on the truck frame and the other end is pivotally connected by a link 30" to the truck frame.

Each of the side frames of the truck, as for example the side frame illustrated in FIG. 2, is provided with a strut 34 extending downwardly from each end to form a seat directly under the adjacent end of the axle 26, which is normally spaced therefrom for all normal loadings of the car when the wheel 28 is properly inflated.

Suitably mounted on the truck frame is a drive motor 36, which is connected by a drive shaft 38 through universal joint connections 40 and 42 at its end to a differential gear transmission 44. The housing for this gear assembly is free of the shaft 26 and an extending arm, as shown in FIG. 2, is pivotally connected by means of a link 46 to the truck. The terminal or final driven gear is keyed to the shaft 26.

Figure 1:
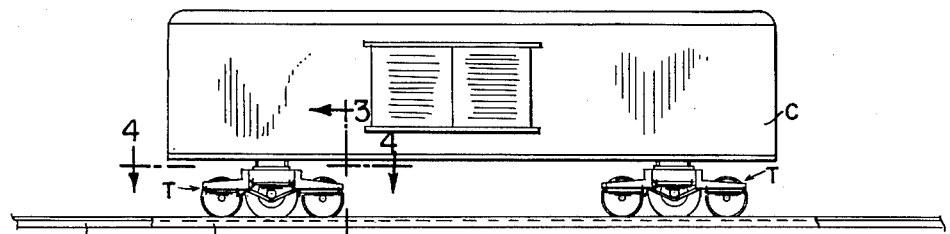
FIGURE 1 is a somewhat diagrammatic side elevational view of a railway car equipped with one form of novel truck assembly according to this invention.

The objects and advantages of this invention as previously expressed are readily apparent from this detailed description of one of the truck assemblies T. It is noted, of course, that both the truck assemblies T of FIG. 1 are of the same construction. As noted, power from the traction motor 30 is delivered to the main drive axle 26 to which the pneumatic tired wheels 28 are attached. The spring suspensions 22 and 24 and 30 and 32 are proportioned so that approximately one-half the total loading for each truck is carried by the pneumatic tired wheels. In the event that the tire is deflated the loading will be transferred to the springs 22 and 24 straining them downwardly so that the truck will settle to the point where the axle 26 rests on the struts 34. The same condition results if the car is switched to a conventional steel rail system. In passing it is noted that the car body C is supported on each of the trucks by means of a conventional turning bearing 48.

Figure 6:
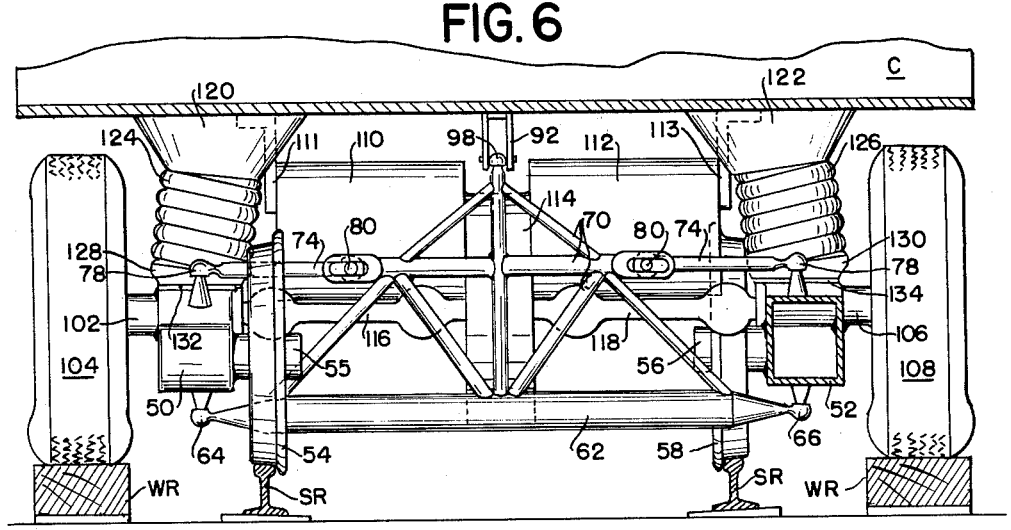
FIGURE 6 is a lefthand elevational end view of this truck assembly.
Figure 7:
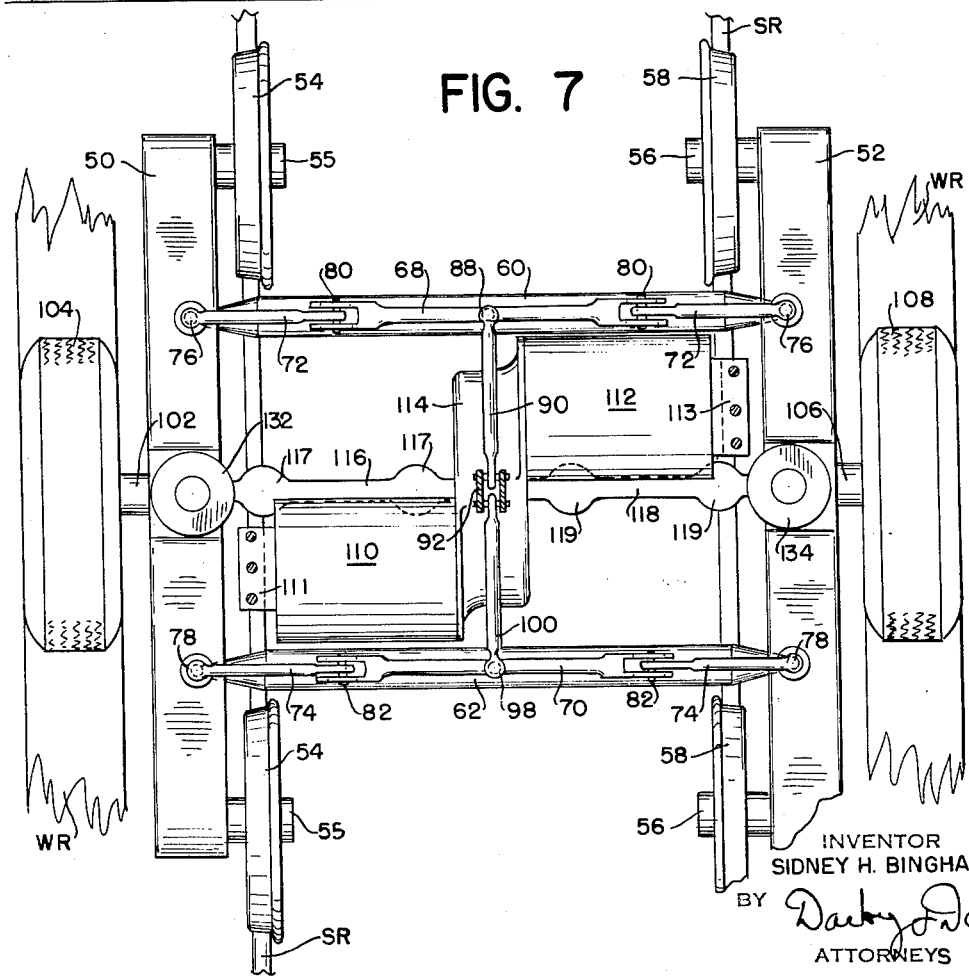
FIGURE 7 is a top plan view of the same assembly.

The modification of the invention disclosed in FIGS. 5, 6 and 7 employs the same principle as does the previous modification but the combination is considerably different in its structural details. This form of the invention provides a still lighter rapid transit truck than the former. As shown the truck consists of a pair of side frame members 50 and 52 which are respectively provided with stub shafts 55 and 56 on which the flanged steel wheels 54 and 58 are mounted respectively. These side frame members are cross-connected by struts or structural members 60 and 62 which are parts of a generally rectangular framework 68 and 70, respectively, of which one is shown in FIG. 6. The ends of the struts 60 and 62 are connected by a ball joint connector 64 and 66, respectively, which engage the downwardly extending brackets on the side frame members. The ends of the top members of the frameworks 68 and 70 are bifurcated, as clearly shown in FIG. 7, and are respectively connected to the side frame members by the links 72 and 74. The links 72 and 74 are attached to the side frame members by ball joint connectors 76 and 78, engaging upwardly extending brackets on the side frame members, as clearly shown in FIG. 6. The other ends of the links 72 and 74 are provided with pins 80 and 82 which have sliding engagement with slots in the bifurcated ends of the upper members of the rectangular frame. The topmost ends of the frames 68 and 70 are pivotally connected by the ball joint connectors 88 and 98 by links 90 and 100, to a depending bracket 92 secured to the bottom of the car body C.

At the longitudinal centers of the side frame members 50 and 52 are stub shafts 102 and 106 on which the rubber tired wheels 104 and 108, respectively, are rotatably mounted. In the case illustrated there are supported from the bottom of the car C, by means of the brackets 111 and 113, respectively, a pair of drive motors 110 and 112. These motors are respectively connected by a power transmission comprising parallel gears, not shown, enclosed within the housing 114. These gear trains for each motor are independent and the output gear of each is connected to the shafts of the rubber tired wheels 104 and 108, respectively, by means of the shafts 116 and 118, which shafts are provided at both ends with universal joint connectors 117 and 119.

Mounted on the bottom of the car body, see FIG. 6, is a pair of side members 120 and 122 for the coiling springs 124 and 126 respectively. These springs rest at their lower ends on fixtures 128 and 130 which form part of turning bearings 132 and 134 on the tops of the side frame members 50 and 52.

It is apparent that the truck structure is of a highly articulated nature with all of the parts interconnected by universal or ball joint connections, so as to provide great flexibility with adequate strength in what amounts to the truck frame. The guidance and relative positioning of the parts is maintained by the engagement of the steel flange wheels with the rails SR. As in the previous case, the power is applied to the rubber tired driving wheels 104 and 108 which ride on special outboard tracks WR. One advantage of this arrangement is the simple parallel gear transmissions centrally mounted. This arrangement, as in the previous case, avoids the use of angle gears such as bevel and hypoid gears.

As can best be appreciated from FIG. 6, it is apparent that if rubber tired wheels are provided with pneumatic tires and one or more of them becomes deflated, the related side frame member can drop a limited distance by reason of the slip joints provided in the bifurcated ends of the frame members in which the pins 80 and 82 slide. This in effect permits the load which was being carried by the deflated wheels to be transferred to the related steel wheels. This arrangement is particularly important when the car is trailed on a conventional track, in which case the outboard rails WR are not present. Under these conditions the rubber tired wheels even if not deflated, are permitted to drop a short distance determined by the length of the slots in the bifurcated ends of the frame members. Thus the car may be trailed on a standard track system without requiring any alteration or mechanical adjustment of the truck structure. The fore and aft links 98 and 100 give lateral stability to the truck and absorb the longitudinal forces arising from tractive and braking efforts.

Figure 8:
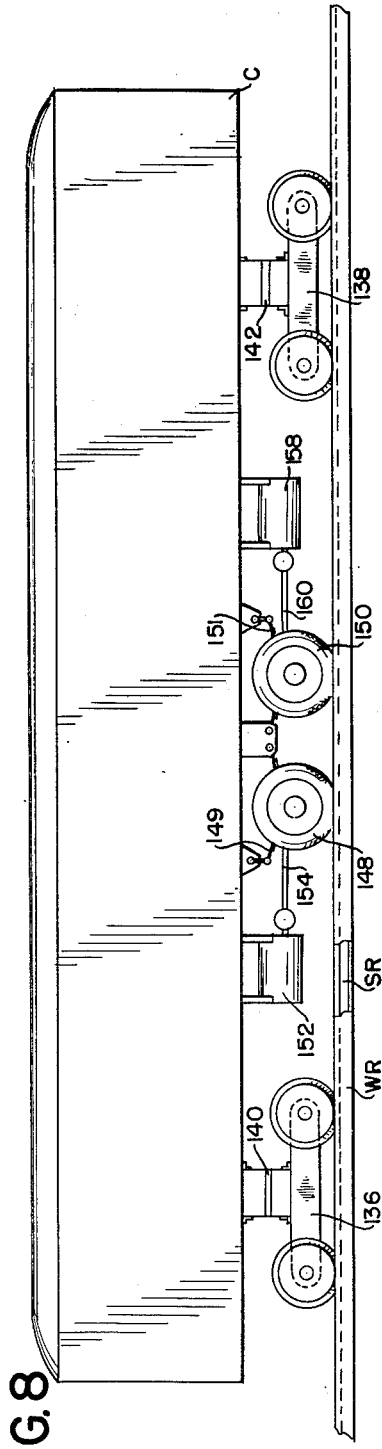
FIGURE 8 is a somewhat diagrammatic side elevational view of the vehicle having a further modified truck assembly in accordance with this invention.
Figure 9:
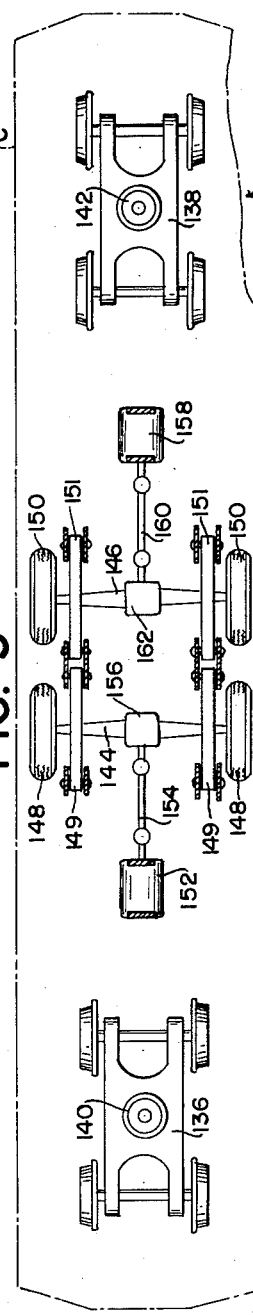
FIGURE 9 is a top plan view of the truck assembly or FIG. 8 showing the vehicle body in dotted outline and some parts in cross-section.
Figure 10:
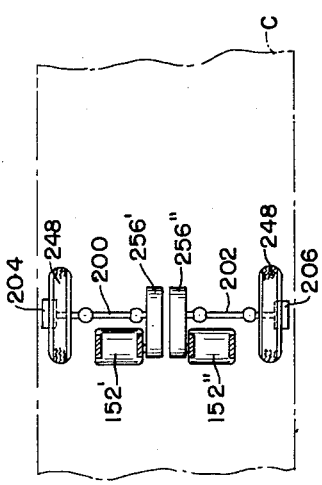
FIGURE 10 is a similar view of a further modified form of drive for the rubber tired wheels of the system of FIG. 9.

Further modifications of the invention are shown in FIGS. 8, 9 and 10. In the first the two pairs of tracks SR and WR are used as before. In this case, however, the car body C is supported at its respective ends by simple rigid frame trucks 136 and 138 provided with two pairs of free-running flanged steel wheels, as shown. These trucks are connected with the car body by the turning bearing members 140 and 142.

Under this arrangement two pairs of rubber tired wheels 148 and 150 are mounted a the longitudinal center of the truck by means of the spring suspension systems 149 and 151 respectively. The axles 144 and 146 for the respective wheel pairs are connected through transmission gears within the housings 156 and 162 to the drive motors 152 and 158 by the universal jointed drive shafts 154 and 160. The central assembly of rubber tired power wheels is directly connected to the car body with no provision for turning or swinging as in the case of the end trucks. In this case, as before, the spring suspensions are adjusted so that a proportion, possibly as high as one-half of the total load of the car, is supported by the rubber tired wheels. All of the advantages of the previous systems are provided with this arrangement in conjunction with the use of very simple end trucks.

An assembly comprising a modification of that illustrated in FIGS. 8 and 9 is shown in FIG. 10, in which case a pair of rubber tired driving wheels 248 are provided at the center of the car. They are attached to the car body by a spring suspension, not shown, or either of those shown in FIG. 9. In this case the drive motors 152′ and 152″ are connected by simple systems of speed reducing parallel gear trains mounted within the housings 256′ and 256″. The output gears of these trains are connected by universal jointed shafts 200 and 202 with planetary gear trains in the housings 204 and 206. The housings 256′ and 256″ can be attached to the underside of the frame of the car body either directly or by the suspension spring systems like those shown in FIG. 9.

Figure 11:
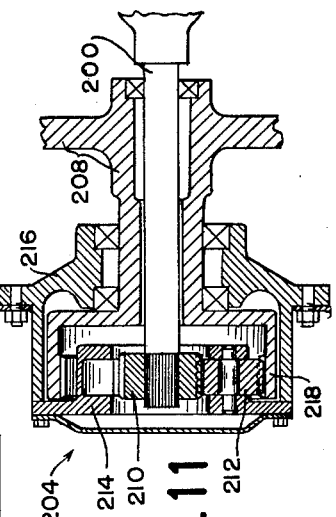
FIGURE 11 is a diametral cross-sectional view through the differential gear train housings or the system of FIG. 10.

There has been illustrated in detail in FIG. 11 the differential gear train assembly 204 of FIG. 10. This is the usual differential gear drive, and as shown the universal jointed shaft 200 extends into a stub-shaft housing 208 which is suspended from the car body by any suitable suspension system such as illustrated for example in FIG. 9. Splined to the end of the shaft 200 is sun gear 210 which meshes with one or more planet gears 212. The planet gears are journaled for rotation in a planet gear cage 214 secured, as shown for example, to the hub housing 216 of the wheel 248. Those skilled in the mechanical arts will readily understand that this arrangement provides a conventional planetary type of drive for the wheel. The same construction is provided for the differential gear assembly 206 for the other wheel 248.

From the above description it will be apparent to those skilled in the art that the subject matter of this invention is capable of modification in many forms, some of which have been suggested herein. It is preferred, therefore, that the scope of protection covered hereby be determined by the claims rather than the disclosure which is given in a purely illustrative sense.

What is claimed is:

1. A transportation vehicle comprising a car body and a truck adjacent each end, each truck comprising a rigid frame including a transverse frame member, two pairs of free-running flanged wheels journaled on said frame, a pair of rubber tired wheels journaled on said frame between said flanged wheel pairs, body supporting turning bearings interposed between said frame member and body, motive means supported on said trucks, and power transmission means connecting said motive means to said rubber tired wheels.

2. In the combination of claim 1, sets of spring suspension means interposed respectively between said flanged wheels and said truck frame and said tired wheels and said truck frame, whereby the load is proportionately distributed to all of said wheels.

3. In the combination of claim 1, suspension springs interposed between said flanged wheels and said truck frame and said tired wheels and said truck frame, whereby the load is proportionately distributed to all of said wheels, and means on said truck frame for limiting the downward movement of the rubber tired wheel springs when the full load is distributed to said flanged wheel springs.

4. In the combination of claim 1, said motive means including a drive motor, a parallel gear transmission connected to said rubber tired wheels, and a universal jointed drive shaft interconnecting the motor with said transmission.

5. In the combination of claim 1, said rubber tired wheels having pneumatic tires, and means on the truck frame for limiting the movement of said truck with respect to said rubber tired wheels in the event they are deflated or hang free.

6. In the combination of claim 1, said flanged wheels being mounted on single axles respectively and said rubber tired wheels being mounted on a single axle, suspension springs interposed between all of said axles and said truck frames whereby the loading on the truck is proportionately distributed between said axles.

7. In the combination of claim 1, said flanged wheels being mounted on single axles respectively and said rubber tired wheels being mounted on a single axle, suspension springs interposed between all of said axles and said truck frames whereby the loading on the truck is proportionately distributed between said axles, and means for limiting the downward movement of the axle for the rubber tired wheels when the loading thereon is removed.

References Cited in the file of this patent
UNITED STATES PATENTS

| | | |
|---|---|---|
| 1,489,998 | Galbraith | Apr. 8, 1934 |
| 2,230,090 | Rabey | Jan. 28, 1941 |
| 2,482,564 | Townsend | Sept. 20, 1949 |
| 2,577,830 | Watts et al. | Dec. 11, 1951 |
| 2,986,102 | Cox | May 30, 1961 |